United States Patent
Kim et al.

(10) Patent No.: US 9,791,541 B2
(45) Date of Patent: Oct. 17, 2017

(54) SYSTEM AND METHOD TO IMPROVE OBJECT TRACKING USING MULTIPLE TRACKING SYSTEMS

(71) Applicant: The Boeing Company, Chicago, IL (US)

(72) Inventors: Kyungnam Kim, Malibu, CA (US); Changsoo Jeong, Santa Monica, CA (US); Yuri Owechko, Malibu, CA (US)

(73) Assignee: The Boeing Company, Chicago, IL (US)

( * ) Notice: Subject to any disclaimer, the term of this patent is extended or adjusted under 35 U.S.C. 154(b) by 188 days.

(21) Appl. No.: 14/578,046

(22) Filed: Dec. 19, 2014

(65) Prior Publication Data

US 2016/0180197 A1 Jun. 23, 2016

(51) Int. Cl.
  G06K 9/00 (2006.01)
  G01S 5/16 (2006.01)
  G06K 9/32 (2006.01)
  G06K 9/62 (2006.01)

(52) U.S. Cl.
  CPC ............ *G01S 5/16* (2013.01); *G06K 9/00785* (2013.01); *G06K 9/3233* (2013.01); *G06K 9/6293* (2013.01)

(58) Field of Classification Search
  None
  See application file for complete search history.

(56) References Cited

U.S. PATENT DOCUMENTS

| | | | |
|---|---|---|---|
| 6,301,370 B1 * | 10/2001 | Steffens | G06K 9/00228 342/90 |
| 6,597,801 B1 | 7/2003 | Cham et al. | |
| 7,587,064 B2 | 9/2009 | Owechko et al. | |
| 8,655,020 B2 * | 2/2014 | Saptharishi | G06K 9/00771 382/103 |
| 8,811,670 B2 | 8/2014 | Mundhenk et al. | |

(Continued)

OTHER PUBLICATIONS

Mundhenk, et al., "Detection of unknown targets from aerial camera and extraction of simple object fingerprints for the purpose of target reacquisition," 2012, Proc. SPIE 8301, Intelligent Robots and Computer Vision XXiX: Algorithms and Techniques, 83010H.

(Continued)

*Primary Examiner* — Nancy Bitar
(74) *Attorney, Agent, or Firm* — Toler Law Group, PC

(57) ABSTRACT

A method includes receiving first tracking data and a first confidence value at a tracker selection system from a first tracking system. The method includes receiving second tracking data and a second confidence value at the tracker selection system from a second tracking system. The tracking systems may be configured to track an object in a sequence of images, and the first and second tracking data may indicate locations of regions where the corresponding tracking system has tracked the object in an image of the sequence of images. The confidence values may indicate likelihoods that a corresponding tracking system is tracking the object. The method further includes providing output data to the first tracking system and to the second tracking system. The output data may include data selected from the first tracking data and the second tracking data based on a result of a comparison of the confidence values.

20 Claims, 8 Drawing Sheets

(56) References Cited

U.S. PATENT DOCUMENTS

| | | | | |
|---|---|---|---|---|
| 9,036,910 | B1* | 5/2015 | Mundhenk | G06T 7/0097 |
| | | | | 382/170 |
| 9,613,273 | B2* | 4/2017 | Hong | G06K 9/00624 |
| 2004/0167667 | A1 | 8/2004 | Goncalves et al. | |
| 2006/0058604 | A1* | 3/2006 | Avinash | A61B 5/06 |
| | | | | 600/407 |
| 2009/0245573 | A1* | 10/2009 | Saptharishi | G06K 9/00771 |
| | | | | 382/103 |
| 2011/0243381 | A1* | 10/2011 | Tsagkatakis | G06K 9/6215 |
| | | | | 382/103 |
| 2011/0286627 | A1* | 11/2011 | Takacs | G06K 9/4642 |
| | | | | 382/103 |
| 2012/0011142 | A1* | 1/2012 | Baheti | G06K 9/4671 |
| | | | | 707/769 |
| 2013/0163815 | A1 | 6/2013 | Mai | |
| 2013/0322763 | A1 | 12/2013 | Heu et al. | |
| 2014/0369555 | A1* | 12/2014 | Zhong | G06K 9/3233 |
| | | | | 382/103 |

OTHER PUBLICATIONS

Dinh, T., et al., "Context Tracker: Exploring Supporters and Distracters in Unconstrained Environments" Computer Vision and Pattern Recognition (CVPR), 2011, The Computer Vision Foundation, pp. 1177-1184.

Babenko, B., et al. "Multiple Instance Learning with Manifold Bags", Proceedings of the 28th International Conference on Machine Learning, 2011, Bellevue, WA, 12 pp.

Kalal, Z., et al., "Tracking-Learning-Detection," IEEE Transactions on Pattern Analysis and Machine Intelligence, Jan. 2010, vol. 6, No. 1, IEEE, Piscataway, NJ, 14 pp.

Firouzi, H., et al., "Robust PCA-Based Visual Tracking by Adaptively Maximizing the Matching Residual Likelihood," 2013 International Conference on Computer and Robot Vision (CRV), May 28-31, 2013, IEEE, Piscataway, NJ, pp. 52-58.

Khosla, D., et al., "A neuromorphic system for object detection and classification," Signal Processing, Sensor Fusion, and Target Recognition, Apr. 29, 2013, vol. 8745, SPIE, Bellingham, WA, 8 pp.

Ni, et al., "Manifold-based fingerprinting for target identification," 2012 IEEE Computer Society Conference on Computer Vision and Pattern Recognition Workshops, 2012, pp. 1-6.

Lowe, D., "Object recognition from local scale-invariant features," Proceedings of the International Conference on Computer Vision, 1999, vol. 2, IEEE Computer Society, Washington, DC, pp. 1-8.

Shi, J., et al., "Good Features to Track," IEEE Conference on Computer Vision and Pattern Recognition, 1994, IEEE, Piscataway, NJ, pp. 593-600.

Kyungnam, K., et al., "Bio-inspired Algorithms for Target Detection and Classification in Airborne Videos," Association for Unmanned Vehicle Systems International, North America 2012, 11 pp.

Birchfield, et al., "Spatiograms Versus Histograms for Region-Based Tracking", 2005 IEEE Computer Society Conference on Computer Vision and Pattern Recognition CVPR'05, vol. 2, IEEE, 2005, pp. 1158 through 1163.

Chang, et al., "A Robust Real-Time Video Stabilization Algorithm", Journal of Visual Communication and Image Representation, vol. 17, 2006, pp. 659 through 673.

Deans, et al., "Combined Feature Based and Shape Based Visual Tracker for Robot Navigation", Aerospace Conference, 2005 IEEE, Dec. 19, 2005, 8 pages.

Kullback, et al., "On Information and Sufficiency", The Annals of Mathematical Statistics, vol. 22, 1951, pp. 79 through 86.

McLaren, "XIII—The Development of the CIE 1976 (L* a* b*) Uniform Colour Space and Colour-Difference Formula", Journal of the Society of Dyers and Colourists, vol. 92, 1976, pp. 338 through 341.

Mundhenk, et al., "Detection of Unknown Targets from Aerial Camera and Extraction of Simple Object Fingerprints for the Purpose of Target Reacquisition", IS&T/SPIE Electronic Imaging, International Society for Optics and Photonics, San Francisco, CA, 2012, 14 pages.

Mundhenk, et al., "Distributed Biologically Based Real Time Tracking in the Absence of Prior Target Information", Optics East 2005, International Society for Optics and Photonics, SPIE, Boston, MA, 2005, pp. 330 through 341.

Nguyen, et al., "Tracking via Object Reflectance Using a Hyperspectral Video Camera", 2010 IEEE Computer Society Conference on Computer Vision and Pattern Recognition—Workshops, Jun. 13-18, 2010, 8 pages.

Ni, et al., "Manifold-Based Fingerprinting for Target Identification", 2012 IEEE Computer Society Conference on Computer Vision and Pattern Recognition Workshops, IEEE, 2012, pp. 1 through 6.

Sand, et al., "Particle Video: Long-Range Motion Estimation Using Point Trajectories", CVPR, Computer Vision and Pattern Recognition, 2006 IEEE Computer Society Conference on., IEEE, Jun. 2006, pp. 2195 through 2202.

Shen, et al., "Video Stabilization Using Principal Component Analysis and Scale Invariant Feature Transform in Particle Filter Framework", IEEE Transactions on Consumer Electronics, vol. 55, 2009, pp. 1714 through 1721.

Non-Final Office Action, U.S. Appl. No. 14/577,983, dated Jun. 15, 2017, 29 pages.

* cited by examiner

SYSTEM AND METHOD TO IMPROVE OBJECT TRACKING USING MULTIPLE TRACKING SYSTEMS

FIELD OF THE DISCLOSURE

The present disclosure relates to a system and method for tracking an object in a sequence of images.

BACKGROUND

Tracking systems are configured to track a moving object in a sequence of images or video. One type of tracking system is a feature-based tracking system. The feature-based tracking system extracts feature data (e.g., data of "point features") from a region in an image that includes object. The feature data includes data representing edges, corners, textures, size, or other aspects of the object that distinguish the object from background pixels. The extracted feature data is representative of the object, and the feature-based tracking system searches subsequent images of the sequence of images for regions that have similar feature data in order to track the object. When the sequence of images has a high quality (e.g., a high number of pixels) and when the object has sufficient features (e.g., texture, size, corners, etc.) to distinguish the object from the background pixels, the feature-based tracker may track the object successfully in the subsequent images. However, when the sequence of images has a low quality (e.g., a small number of pixels) or when the object lacks sufficient features to distinguish the object from the background pixels, the feature-based tracking system may be unable to track the object in the subsequent images.

Another type of tracking system is an instance-based tracking system, also referred to as a multiple instance learning (MIL) tracking system. The instance-based tracking system determines instances (e.g., small "snapshots") of regions in the image that include the object (e.g., positive instances) and instance of regions surrounding the object (e.g., negative instances). The instance-based tracking uses the instances to track the object in subsequent images of the sequence of images (e.g., by identifying similar positive instances or negative instances). Because the instances may indicate a difference between the object and surrounding regions when the object has relatively few features or when the sequence of images has a low quality (e.g., a small number of pixels), the instance-based tracking system may be able to track the object in subsequent images that are problematic for the feature-based tracking system. However, when an image includes multiple regions that appear similar to the object, the instance-based tracking system may be unable to distinguish the object from a region having a similar appearance. Additionally, when one or more characteristics of the object changes in the subsequent images, the instances may not be similar enough to the appearance of the object in the subsequent images, causing the instance-based tracking system to lose track of the object.

SUMMARY

An image processing system includes a first tracking system, a second tracking system, and a tracker selection system (e.g., a "hybrid" tracking system). The first tracking system and the second tracking system are configured to track an object in a sequence of images. In a particular embodiment, the first tracking system is a feature-based tracking system and the second tracking system is an instance-based tracking system. The tracker selection system may receive first tracking data and a first confidence value from the first tracking system and may receive second tracking data and a second confidence value from the second tracking system. The first tracking data and the second tracking data may indicate locations of regions where the corresponding tracking system has tracked the object in an image. The tracker selection system may compare the confidence values, and based on a result of the comparison, the tracker selection system may provide output data including tracking data corresponding to the higher confidence value. The first tracking system and the second tracking system may use the output data, instead of their respective tracking data, to track the object in a subsequent image of the sequence of images. Thus, tracking data corresponding to a tracking system having a higher likelihood of success may be used by both tracking systems to track the object. In this manner, the tracker selection system may leverage the benefits of both the feature-based tracking system and the instance-based tracking system without experiencing the drawbacks associated with either of the tracking systems operating individually.

In a particular embodiment, the image processing system may include a third tracking system. The third tracking system may be a "lightweight" tracking system (e.g., the third tracking system may perform faster and using less processing resources but may be associated with a lower tracking accuracy than the first tracking system and the second tracking system). For example, the third tracking system may perform object tracking by comparing groups (e.g., "patches") of pixels in different images to track the object. The third tracking system may run during time periods when the first tracking system and the second tracking system do not process images of the sequence of images. For example, the third tracking system may run during initialization time periods of the first tracking system and the second tracking system, or the third tracking system may run at a faster frame rate (e.g., the first tracking system and the second tracking system may process one out of every five images, but the third tracking system may process each image). The third tracking system may provide location data to the first tracking system and to the second tracking system to reduce a likelihood that the first tracking system and the second tracking system lose track of the object between processed images.

Additionally, the image processing system may include a sub-window tracking system. The sub-window tracking system may receive the output data from the tracker selection system and may determine a sub-window that is to be searched in a subsequent image based on the output data. The sub-window tracking system may provide sub-window data that indicates the sub-window to the first tracking system and to the second tracking system. The first tracking system and the second tracking system may search for the object in the sub-window of the subsequent image instead of in an entirety of the subsequent image. Reducing a search area of the subsequent image for the first tracking system and the second tracking system may increase speed and reduce power consumption of the first tracking system and the second tracking system.

In a particular embodiment, a method includes receiving first tracking data and a first confidence value at a tracker selection system from a first tracking system. The first tracking system may be configured to track an object in a sequence of images and the first tracking data may indicate a first location of a first region where the first tracking system has tracked the object in an image of the sequence of images. The first confidence value may indicate a likelihood that the first tracking system is tracking the object. The method includes receiving second tracking data and a second confidence value at the tracker selection system from a second tracking system. The second tracking system may be configured to track the object in the sequence of images and the second tracking data may indicate a second location of a second region where the second tracking system has tracked the object in the image. The second confidence value may indicate a likelihood that the second tracking system is tracking the object. The method further includes providing output data to the first tracking system and to the second tracking system. The output data may include data selected from the first tracking data and the second tracking data based on a result of a comparison of the first confidence value and the second confidence value.

In another particular embodiment, a tracker selection system includes one or more processors and a memory coupled to the one or more processors. The memory stores instructions that, when executed by the one or more processors, cause the one or more processors to perform operations. The operations include receiving first tracking data and a first confidence value from a first tracking system. The first tracking system may be configured to track an object in a sequence of images and the first tracking data may indicate a first location of a first region where the first tracking system has tracked the object in an image of the sequence of images. The first confidence value may indicate a likelihood that the first tracking system is tracking the object. The operations include receiving second tracking data and a second confidence value from a second tracking system. The second tracking system may be configured to track the object in the sequence of images and the second tracking data may indicate a second location of a second region where the second tracking system has tracked the object in the image. The second confidence value may indicate a likelihood that the second tracking system is tracking the object. The operations further include providing output data to the first tracking system and to the second tracking system. The output data may include data selected from the first tracking data and the second tracking data based on a result of a comparison of the first confidence value and the second confidence value.

In another particular embodiment, a non-transitory computer readable medium includes instructions that, when executed by a processor, cause the processor to receive first tracking data and a first confidence value at a tracker selection system from a first tracking system. The first tracking system may be configured to track an object in a sequence of images and the first tracking data may indicate a first location of a first region where the first tracking system has tracked the object in an image of the sequence of images. The first confidence value may indicate a likelihood that the first tracking system is tracking the object. The instructions cause the processor to receive second tracking data and a second confidence value at the tracker selection system from a second tracking system. The second tracking system may be configured to track the object in the sequence of images and the second tracking data may indicate a second location of a second region where the second tracking system has tracked the object in the image. The second confidence value may indicate a likelihood that the second tracking system is tracking the object. The instructions further cause the processor to provide output data to the first tracking system and to the second tracking system. The output data may include data selected from the first tracking data and the second tracking data based on a result of a comparison of the first confidence value and the second confidence value.

The features, functions, and advantages that have been described can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Embodiments disclosed herein enable an image processing system that includes a first tracking system, a second tracking system, and a tracker selection system (e.g., a "hybrid" tracking system). The first tracking system and the second tracking system are configured to track an object in a sequence of images. The first tracking system and the second tracking system may each track the object in an image and provide corresponding tracking data (indicating a location of a region where the tracking system has tracked the object in the image) and a corresponding confidence value to the tracker selection system. The tracker selection system may compare the confidence values, and based on a result of the comparison, the tracker selection system may provide output data to the first tracking system and the second tracking system. The output data may include tracking data corresponding to the higher confidence value. The first tracking system and the second tracking system may track the object in a subsequent image of the sequence of images based on the output data instead of based on the tracking data generated at the respective tracking system. Because the tracking selection system provides output data corresponding to a higher confidence value, the tracker selection system may be associated with a higher tracking accuracy than either the first tracking system or the second tracking system operating individually.

Figure 1:
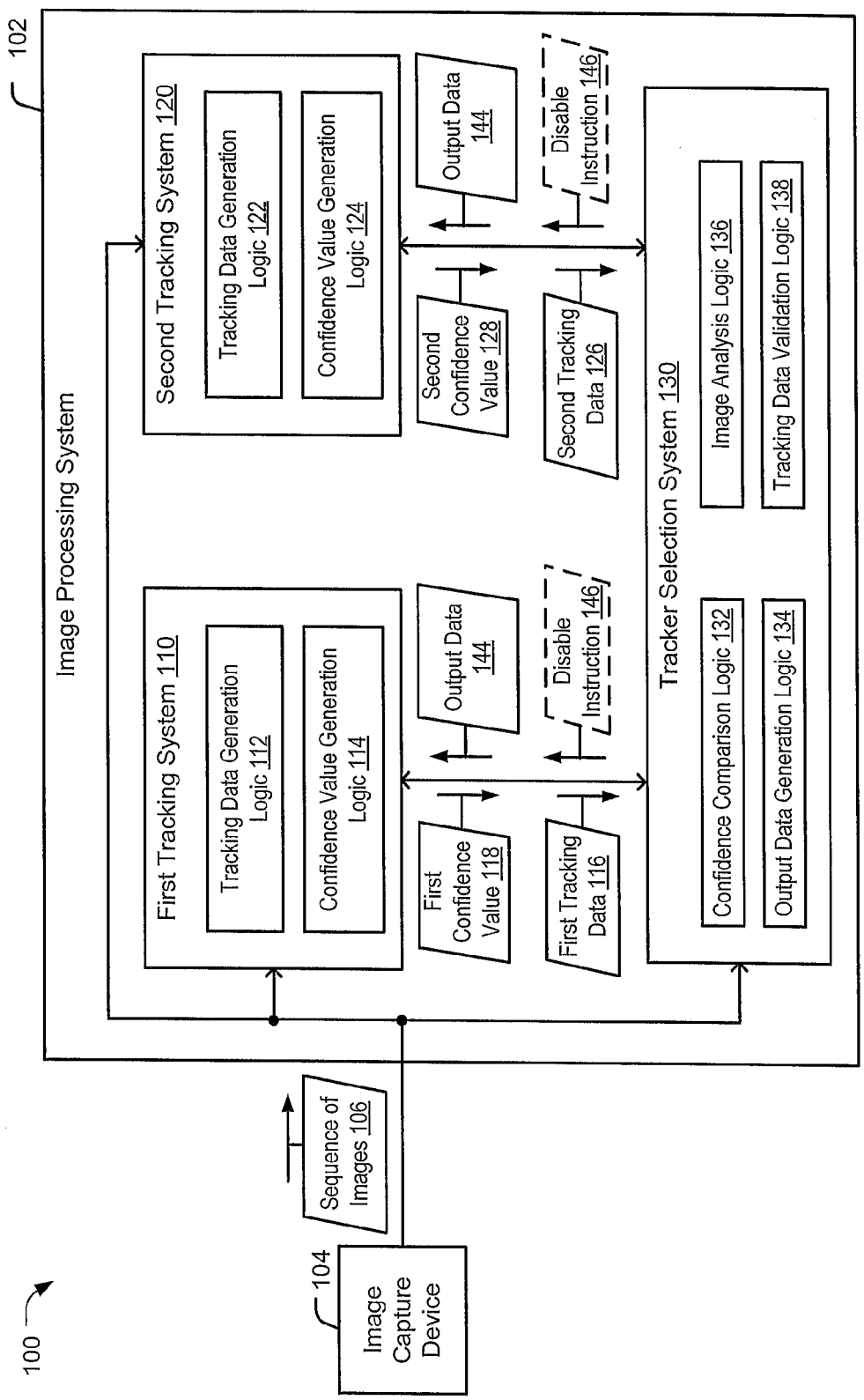
FIG. 1 is a block diagram that illustrates a particular embodiment of an image processing system including two tracking systems and tracker selection system.

FIG. 1 illustrates a particular embodiment of a system 100 including an image processing system 102 and an image capture device 104. The image processing system 102 may be coupled to the image capture device 104 and may be configured to receive and process a sequence of images 106 from the image capture device 104. The image capture device 104 may be any device capable of capturing sequences of images or video, such as a camera, a digital camera, a video camera, a still frame camera, an electro-optical (EO) image capture device, an infrared (IR) image capture device, a radar image capture device, a thermal image capture device, an ultrasound image capture device, a light detection and ranging (LIDAR) image capture device, or some other type of image capture device. The sequence of images 106 may include camera images, digital images, frames of video, frames of digital video, EO images, IR images, radar images, thermal images, ultrasound images, LIDAR images, or other types of images. Although the image capture device 104 is illustrated as external to the image processing system 102, this is merely for convenience to illustrate that the image capture device 104 may be independent or distinct from the image processing system 102. In particular embodiments, the image capture device may be a component of the image processing system 102.

The image processing system 102 may be configured to process image data of the sequence of images 106 and to provide object tracking of an object in the sequence of images 106. The object may be indicated based on a user input (e.g., a user may select an object in an image via a user input device) or the object may be selected automatically by the image processing system 102 based on criteria stored at a memory accessible to the image processing system 102. To perform the object tracking, the image processing system 102 includes a first tracking system 110, a second tracking system 120, and a tracker selection system 130 (e.g., a "hybrid tracker system"). The first tracking system 110 and the second tracking system 120 may be configured to process the sequence of images 106 to track the object in the sequence of images 106. The object may be a moving object or an object that moves with respect to a field of vision of the image capture device 104. For example, a moving object may include a person that is walking or running, a vehicle (e.g., a car, a truck, a military vehicle, a watercraft, an aircraft, an autonomous aircraft, a spacecraft, a missile, a rocket, etc.), an object located on a moving vehicle, or some other type of moving object. As another example, the image capture device 104 may be coupled to an aircraft, such as an autonomous aircraft (e.g., a drone aircraft), and the object may move with respect to the field of vision of the image capture device 104 due to movement of the aircraft.

The first tracking system 110 may be configured track the object in the sequence of images 106. For example, the first tracking system 110 may be configured to track the object using a tracking algorithm or methodology. To track the object, the first tracking system 110 may generate data (e.g., an object model) that represents the object. The data may be generated based on image data that corresponds to a region in an initial image of the sequence of images 106 that includes the object. In a particular embodiment, the first tracking system 110 receives a user input that indicates the object (e.g., a user may draw a box around the object in the first image). In another particular embodiment, the first tracking system 110 determines the object based on one or more criteria stored at a memory accessible to the first tracking system 110.

After generating the data (e.g., the object model) that represents the object, the first tracking system 110 may use the data (e.g., the object model) to track the object in subsequent images of the sequence of images 106. For example, the first tracking system 110 may compare the data (e.g., the object model) to additional data corresponding to (or generated based on) regions of a subsequent image and may determine whether any of the additional data matches the object model (e.g., within selected tolerances). When a match is found, the first tracking system 110 may determine that the region in the subsequent image includes the object (e.g., the first tracking system 110 may track the object to the region in the subsequent image), and the first tracking system 110 may determine a location of the region. The location of the region (e.g., of the object) in the subsequent image may be used by the first tracking system 110 to track the object in another image of the sequence of images 106.

In a particular embodiment, the first tracking system 110 is an adaptive tracking system that is configured to modify an object model (e.g., to update data representing the object) based on one or more changes to the object in subsequent images. In another particular embodiment, the first tracking system 110 is a non-adaptive tracking system that does not modify the object model (e.g., the first tracking system 110 does not update the data representing the object based on the subsequent images).

The first tracking system 110 may include tracking data generation logic 112 configured to generate first tracking data 116 during tracking of the object in the sequence of images 106. To illustrate, the first tracking system 110 may track the object (e.g., determine that the object is located) in a first region of an image of the sequence of images 106. For example, the first region may be determined using the object model maintained by the first tracking system 110. The tracking data generation logic 112 may generate the first tracking data 116 that indicates a location of the region in the image. For example, the first tracking data 116 may include coordinates (e.g., x y coordinates) of a center of the first region and one or more measurements (e.g., a length and a width) of the first region. As another example, the first tracking data 116 may include coordinates of four corners of the first region. In other embodiments, the first tracking data 116 may include other forms of location data. In a particular embodiment, the first tracking data 116 also includes image data corresponding to the region in the image (e.g., a subset of the image data corresponding to the image). In another particular embodiment, the first tracking data 116 does not include the image data. The first tracking system 110 may provide the first tracking data 116 to the tracker selection system 130. In a particular embodiment, the first tracking system 110 processes each image of the sequence of images 106 and provides the first tracking data 116 for each image. In another particular embodiment, the first tracking system 110 is configured to process images at a particular frame rate, and the first tracking system 110 provides the first tracking data 116 for one out of every x images of the sequence of images 106, where x is an integer greater than one.

The first tracking system 110 may also include confidence value generation logic 114. The confidence value generation logic 114 may be configured to generate a first confidence value 118 that indicates a likelihood that the object is being tracked by the first tracking system 110. The first confidence value 118 may be generated using in accordance with the tracking algorithm or methodology used by the first tracking system 110. The first tracking system 110 may provide the first confidence value 118 with the first tracking data 116 to the tracker selection system 130.

The second tracking system 120 may also be configured to track the object in the sequence of images 106. The second tracking system 120 may be an adaptive tracking system or a non-adaptive tracking system, similar to the first tracking system 110. However, the second tracking system 120 may be configured to track the object using a different tracking algorithm or methodology than the first tracking system 110. The second tracking system 120 may include tracking data generation logic 122 and confidence value generation logic 124, similar to the first tracking system 110. The tracking data generation logic 122 may be configured to generate second tracking data 126 that indicates a second location of a second region where the second tracking system 120 has tracked the object in the image. The confidence value generation logic 124 may be configured to generate a second confidence value 128 that indicates a likelihood that the object is being tracked by the second tracking system 120. The second tracking system 120 may be configured to provide the second tracking data 126 and the second confidence value 128 to the tracker selection system 130. The second tracking system 120 may provide the second tracking data 126 and the second confidence value 128 for each image of the sequence of images 106, or at a particular frame rate, in a similar manner to the first tracking system 110.

In a particular embodiment described herein, the first tracking system 110 is a feature-based tracking system and the second tracking system 120 is an instance-based tracking system. In this embodiment, the first tracking system 110 (e.g., the feature-based tracking system) is configured to track the object based on feature data extracted from the sequence of images 106, and the second tracking system 120 (e.g., the instance-based tracking system) is configured to track the object based on one or more instances of the object and regions surrounding the object. Although this embodiment is described further herein, the disclosure is not limited to only this embodiment. In other embodiments, the first tracking system 110 and the second tracking system 120 may be other tracking systems, such as mean-shift tracking systems, absolute difference tracking systems, Kanade-Lucas-Tomasi (KLT) tracking systems, or other tracking systems.

The tracker selection system 130 may be configured to generate output data 144 based on the first tracking data 116 and the first confidence value 118 received from the first tracking system 110 and based on the second tracking data 126 and the second confidence value 128 received from the second tracking system 120. The output data 144 may include data selected from the first tracking data 116 and the second tracking data 126 based on a comparison of the first confidence value 118 and the second confidence value 128. For example, the tracker selection system 130 may include confidence comparison logic 132 configured to compare the first confidence value 118 and the second confidence value 128. The tracker selection system 130 may also include output data generation logic 134 configured to generate the output data 144 based on a result of the comparison performed by the confidence comparison logic 132.

To illustrate, the confidence comparison logic 132 may compare the first confidence value 118 and the second confidence value 128. When the first confidence value 118 is greater than or equal to the second confidence value 128, the confidence comparison logic 132 may cause the output data generation logic 134 to include the first tracking data 116 in the output data 144. When the second confidence value 128 exceeds the first confidence value 118, the confidence comparison logic 132 may cause the output data generation logic 134 to include the second tracking data 126 in the output data 144. The tracker selection system 130 may provide the output data 144 to the first tracking system 110 and to the second tracking system 120.

The tracker selection system 130 may also include image analysis logic 136. The image analysis logic 136 may be configured to analyze the sequence of images 106 and to determine one or more characteristics of the sequence of images 106. For example, the one or more characteristics may include an image type (e.g., an EO image, an IR image, a LIDAR image, etc.), a number of pixels per image, a change in scale between images of the sequence of images 106, a change in rotation between images of the sequence of images 106, other image characteristics, or a combination thereof. The output data generation logic 134 may select tracking data to be included in the output data 144 based on a determination of whether the one or more characteristics include a characteristic from a first set of characteristics associated with better performance at the first tracking system 210 than at the second tracking system 220 or from a second set of characteristics associated with better performance at the second tracking system 220 than at the first tracking system 210.

For example, the image analysis logic 136 may determine that a scale of objects in a first image of the sequence of images 106 significantly changes in a second image of the sequence of images 106. Significant scale changes may be included in the first set of characteristics associated with better performance at the first tracking system 110 than at the second tracking system 120. Based on a determination that the sequence of images 106 includes significant scale changes (e.g., a characteristic from the first set of characteristics), the image analysis logic 136 may cause the output data generation logic 134 to include the first tracking data 116 in the output data 144. Other examples of characteristics from the first set of characteristics include significant rotation changes between images, images with a large number of features, images with a high quality, images with a large number of pixels, etc.

As another example, the image analysis logic 136 may determine that an image of the sequence of images 106 has a small number of pixels (e.g., is a low-quality image). A feature-based tracking system (e.g., the first tracking system 110) may have difficulty tracking the object in the image that has a small number of pixels, but an instance-based tracking system (e.g., the second tracking system 120) may not have difficulty tracking the image that has a small number of pixels. Thus, a small number of pixels (e.g., the characteristic) may be included in the second set of characteristics associated with better performance at the second tracking system 120 than at the first tracking system 110. Based on this analysis, the image analysis logic 136 may cause the output data generation logic 134 to include the second tracking data 126 in the output data 144. Other examples of characteristics from the second set of characteristics include images with a small number of features, images where the object being tracked is small, etc.

In a particular embodiment, the tracking data selected for inclusion in the output data 144 may be selected based on the one or more characteristics and a result of the comparison of the first confidence value 118 and the second confidence value 128. In other embodiments, the tracking data selected for inclusion in the output data 144 is selected based on the one or more characteristics, and is not based on the result of the comparison of the first confidence value 118 and the second confidence value 128.

In another particular embodiment, a disable instruction 146 may be generated based on the one or more of the characteristics determined by the image analysis logic 136. For example, a third set of characteristics may be associated with a high failure rate at the first tracking system 110. When the image analysis logic 136 determines that a particular characteristic of the image matches one of the third set of characteristics, the image analysis logic 136 may cause the disable instruction 146 to be provided to the first tracking system 110. For example, IR images may be associated with a high failure rate at the first tracking system 110 (e.g., the feature-based tracking system) due to IR images having low quality and few features. Thus, when the sequence of images 106 includes IR images, the tracker selection system 130 may disable the first tracking system 110 by providing the disable instruction 146. Disabling a particular tracking system may reduce use of processing resources and power consumption by the image processing system 102, and may be desirable when the particular tracking system has a high likelihood of failing to track the object.

In another particular embodiment, the tracker selection system 130 includes tracking data validation logic 138 configured to determine whether the first tracking data 116 is valid and whether the second tracking data 126 is valid. In some situations, the first tracking system 110 or the second tracking system 120 may generate a high confidence value even when tracking an incorrect object, and the tracking data validation logic 138 may be used to prevent incorrect tracking data from being included in the output data 144. The tracking data validation logic 138 may validate the first tracking data 116 and the second tracking data 126 using tracking fingerprints, pixel comparisons, or other validation methods.

After determining whether the first tracking data 116 and the second tracking data 126 are valid, the tracking data validation logic 138 may determine whether the first tracking data 116 or the second tracking data 126 is included in the output data 144. When only one of the first tracking data 116 and the second tracking data 126 is valid, the valid tracking data may be included in the output data 144. When both the first tracking data 116 and the second tracking data 126 are valid, the tracking data corresponding to the higher confidence value is included in the output data 144, as described above. When neither of the first tracking data 116 and the second tracking data 126 are valid, neither of the first tracking data 116 and the second tracking data 126 are included in the output data 144.

During operation, the first tracking system 110 may track the object in an image of the sequence of images 106 and may provide the first tracking data 116 and the first confidence value 118 to the tracker selection system 130. The second tracking system 120 may also track the object in the image and may provide the second tracking data 126 and the second confidence value 128 to the tracker selection system 130. The first tracking data 116 may indicate a first location of a first region where the first tracking system 110 has tracked the object in the image, and the second tracking data 126 may indicate a second location of a second region where the second tracking system 120 has tracked the object in the image. Because the first tracking system 110 and the second tracking system 120 use different tracking algorithms or methodologies, the first location and the second location may be different.

After receiving the first tracking data 116, the first confidence value 118, the second tracking data 126, and the second confidence value 128, the tracker selection system may compare the first confidence value 118 and the second confidence value 128. Based on a result of the comparison, the tracker selection system 130 may generate and provide the output data 144 to the first tracking system 110 and the second tracking system 120. When the first confidence value 118 is greater than or equal to the second confidence value 128, the output data 144 may include the first tracking data 116, and when the second confidence value 128 exceeds the first confidence value 118, the output data 144 may include the second tracking data 126. In a particular embodiment, the tracking data (e.g., the first tracking data 116 or the second tracking data 126) selected for inclusion in the output data 144 may also be selected based on one of more characteristics of the sequence of images 106. In another particular embodiment, prior to selecting the first tracking data 116 or the second tracking data 126 for inclusion in the output data 144, the tracker selection system 130 may determine whether the first tracking data 116 and the second tracking data 126 are valid.

The output data 144 may be used by the first tracking system 110 and the second tracking system 120 to track the object in a subsequent image of the sequence of images 106. For example, the first tracking system 110 may use the output data 144 instead of the first tracking data 116 to track the object in the subsequent image. Additionally, the second tracking system 120 may use the output data 144 instead of the second tracking data 126 to track the object in the subsequent image. Additionally, the tracker selection system 130 may provide the output data 144 to one or more other systems (not shown). For example, the image processing system 102 and the image capture device 104 may be integrated in an autonomous aircraft (e.g., a drone aircraft), and the tracker selection system 130 may provide the output data 144 to another system of the autonomous aircraft, such as a video capture device control system or a flight-path control system (e.g., a piloting system). As another example, the output data 144 may be transmitted via one or more communication networks (e.g., a wireless communication network, a cellular communication network, a satellite network, etc.) to a server or a computing device of an operator of the autonomous aircraft.

By providing the output data 144, the tracker selection system 130 (e.g., the hybrid tracking system) may enable each of the first tracking system 110 and the second tracking system 120 to more accurately track the object than if the first tracking system 110 and the second tracking system 120 operated individually. For example, in situations where the first tracking system 110 (e.g., the feature-based tracking system) is more likely to be tracking the object than the second tracking system 120 (e.g., the instance-based tracking system), the output data 144 may include the first tracking data 116. Because the second tracking system 120 uses the output data 144 instead of the second tracking data 126 to track the object, the second tracking system 120 may continue to track the object when it would otherwise lose track of the object. Similarly, when the second tracking system 120 is likely to be tracking the object, the output data 144 includes the second tracking data 126 from the second tracking system 120. Thus, the tracker selection system 130 may be have a higher tracking accuracy than either the first tracking system 110 or the second tracking system 120 operating individually.

In FIG. 1, components of the image processing system 102 are illustrated as functional blocks. For example, the first tracking system 110 is shown as a particular functional block that includes functional sub-blocks, such as the tracking data generation logic 112 and the confidence value generation logic 114. The image processing system 102 and its components are illustrated as functional blocks merely for convenience of description. In various embodiments, the image processing system 102 may include hardware, software, or both, to perform functions described herein as associated with the image processing system 102 and its components. Additionally, functions described with reference to particular functional blocks or sub-blocks may instead be performed by software or hardware associated with others of the functional blocks or sub-blocks. Thus, the disclosure is not limited to the specific functional blocks illustrated or the arrangement of functions with specific hardware or software.

Components of the image processing system 102, such as the first tracking system 110, the second tracking system 120, and the tracker selection system 130, may be centralized (e.g., executed at a particular device) or may be decentralized (e.g., executed at a plurality of devices), and may function independently (although cooperatively) or dependently upon one another. Additionally, it is to be understood that each component of the image processing system 102 may include a processor, memory accessible to the processor, and instructions executable by the processor stored in the memory to perform the actions described herein. Alternatively or in addition, one or more of the components of the image processing system 102 may include hardware (such as an application specific integrated circuit and/or digital logic) configured to execute some or all of the functions of the components. Additionally, although two tracking systems are described, in other embodiments the image processing system 102 may include more than two tracking systems, and the tracker selection system 130 may select from tracking data received from more than two tracking systems for inclusion in the output data 144. Increasing the number of tracking systems included in the image processing system 102 may increase a tracking accuracy of the image processing system 102.

Figure 2:
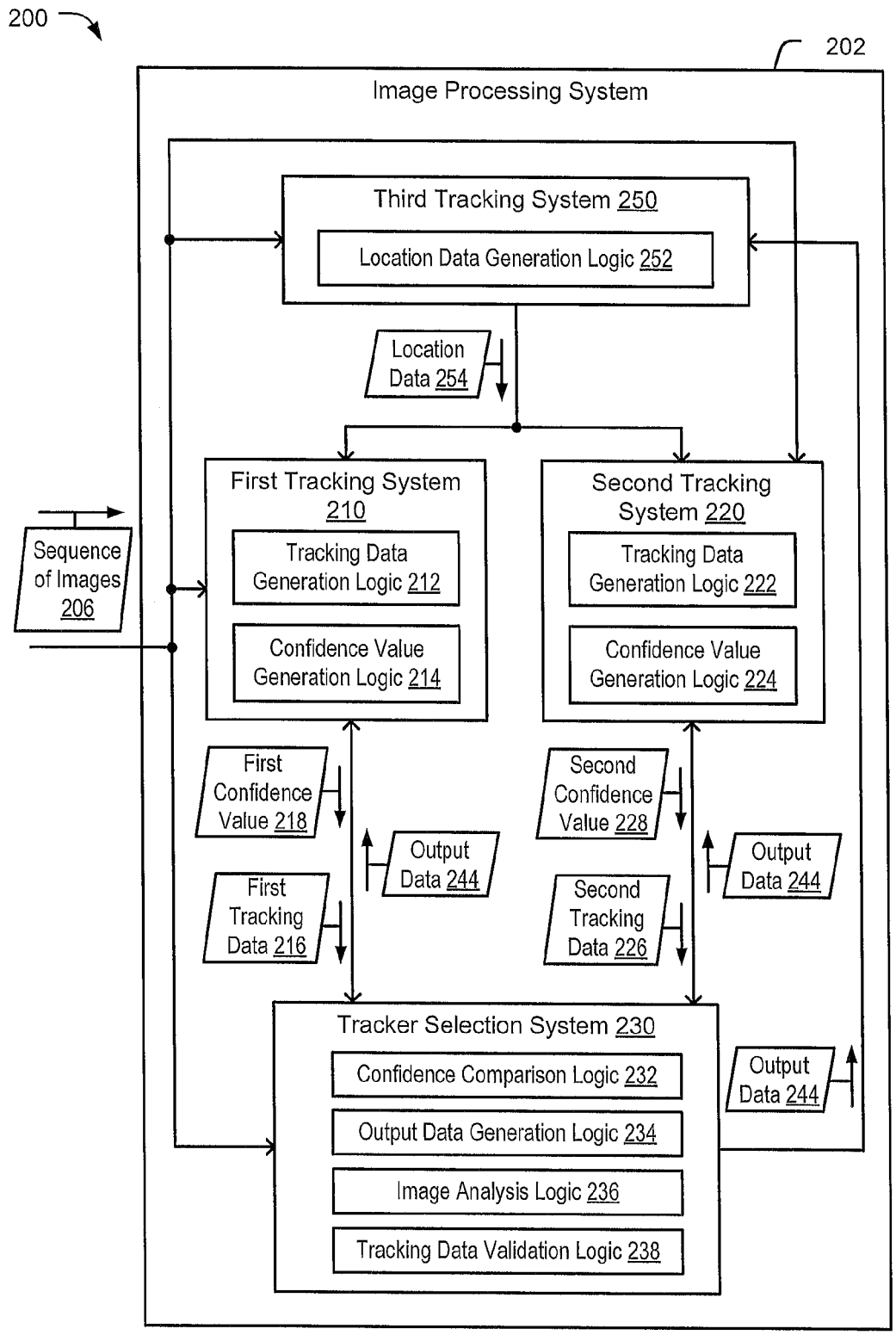
FIG. 2 is a diagram of a first particular embodiment of the image processing system of FIG. 1 that includes a third tracking system.

FIG. 2 illustrates a first particular embodiment of the system 100 of FIG. 1 and is generally designated 200. The system 200 includes an image processing system 202, which may include or correspond to the image processing system 102 of FIG. 1. As illustrated in FIG. 2, the image processing system 202 receives a sequence of images 206 from an image capture device, such as the image capture device 104 of FIG. 1, which is not shown for convenience of illustration. The image processing system 202 includes a first tracking system 210, a second tracking system 220, and a tracker selection system 230 (e.g., a hybrid tracker). The first tracking system 210 includes tracking data generation logic 212 and confidence value generation logic 214, and the second tracking system 220 includes tracking data generation logic 222 and confidence value generation logic 224. The tracker selection system 230 includes confidence comparison logic 232, output data generation logic 234, image analysis logic 236, and tracking data validation logic 238. The first tracking system 210, the second tracking system 220, and the tracker selection system 230, and components thereof, may include or correspond to the first tracking system 110, the second tracking system 120, and the tracker selection system 130, respectively, of FIG. 1.

The image processing system 202 also includes a third tracking system 250. The third tracking system 250 may be configured to track the object in the sequence of images 206 and to provide location data 254 to the first tracking system 210 and to the second tracking system 220. The location data 254 may be provided to the first tracking system 210 and to the second tracking system 220 during a time period that the first tracking system 210 and the second tracking system 220 do not process images of the sequence of images 206. For example, the location data 254 may be provided during an initialization time period (e.g., a time period that the first tracking system 210 and the second tracking system 220 determine data, such as feature data or one or more instances, used to track the object) of the first tracking system 210 and the second tracking system 220. As another example, the first tracking system 210 and the second tracking system 220 may be configured to process images at a particular frame rate (e.g., one out of every x images may be processed, where x is an integer greater than one), and the location data 254 may be provided during time periods between processing of images by the first tracking system 210 and the second tracking system 220. The first tracking system 210 and the second tracking system 220 may estimate a location of the object in an image based on the location data 254, as described herein, which may reduce a likelihood that the first tracking system 210 and the second tracking system 220 lose track of the object during time periods that the first tracking system 210 and the second tracking system 220 do not process images.

To track the object in the sequence of images, the third tracking system 250 may include location data generation logic 252. The location data generation logic 252 may be configured to track the object by performing "patch matching," which may also be referred to as "pattern matching" or "cross correlation." For example, the third tracking system 250 may receive image data representing the object in a region of a first image of the sequence of images 206 (e.g., based on a user selection or automatically determined). The location data generation logic 252 may determine a first group (e.g., "patch") of pixels in the first image that corresponds to (e.g., represents) the object. When the third tracking system 250 receives a second image of the second image of the sequence of images 206, the location data generation logic 252 may search the second image for a second group (e.g., patch) of pixels that "matches" the first group (e.g., patch) of pixels. Two groups (e.g., patches) of pixels may match when a correlation value (e.g., a similarity value) exceeds a threshold value. When the location data generation logic 252 identifies a second group of pixels that matches the first group of pixels, the location data generation logic 252 determines a location of the second group of pixels in the second image and generates the location data 254 indicating the location of the second group of pixels. For example, the location data 254 may include location coordinates of a center of the second group of pixels and a size (e.g., a length and a width) of the second group of pixels, location coordinates of four corners of the second group of pixels, or some other location data. The location data generation logic 252 may output the location data 254 (indicating the location of the second group of pixels) to the first tracking system 210 and the second tracking system 220.

Performing patch matching may be faster and may use less processing resources than the object tracking performed by the first tracking system 210 and by the second tracking system 220 (e.g., feature-based tracking, instance-based tracking, etc.). Thus, the third tracking system 250 may be able to process images at a faster rate and with little to no initialization time period, as compared to the first tracking system 210 and the second tracking system 220. Accordingly, the third tracking system 250 may be referred to as a "lightweight" tracking system. However, the third tracking system 250 may also have a lower tracking accuracy, as compared to the first tracking system 210 and the second tracking system 220. For example, the third tracking system 250 may have a high likelihood of losing track of the object after many images are processed. To reduce the likelihood that the third tracking system 250 loses track of the object, the tracker selection system 230 may provide the output data 244 to the third tracking system 250. The third tracking system 250 may be configured to be re-initialized based on the output data 244. For example, the third tracking system 250 may track the object in a next-processed image based on a location indicated by the output data 244, instead of a location determined by the third tracking system 250. Because the output data 244 from the tracker selection system 230 has a high likelihood of being correct, periodically re-initializing the third tracking system 250 based on the output data 244 may prevent, or reduce a likelihood, that the third tracking system 250 loses track of the object due to the lower tracking accuracy of the third tracking system 250.

After receiving the location data 254, the first tracking system 210 and the second tracking system 220 may be configured to track the object in an image of the sequence of images 206 based on the location data 254. For example, the first tracking system 210 and the second tracking system 120 may estimate a location of the object in a next-processed image based on the location data 254. The estimated location may have a higher likelihood of being correct than a location that is estimated based on a previously processed image (e.g., an image processed prior to the time period when no images are processed). For example, the first tracking system 210 and the second tracking system 220 may be configured to use the location estimated based on the previously processed image as an initial search location for the object in the next-processed image. If the object is moving quickly and/or if a time period between processed images is large (e.g., if a large number of images go unprocessed between processed images), the object may not be located near the estimated location in the next-processed image. If the initial search location is not correct, the first tracking system 210 and the second tracking system 220 may lose track of the object, or may spend a significant amount of time searching an entirety of the next-processed image for the object.

To reduce the likelihood that the initial search location is incorrect, the first tracking system 210 and the second tracking system 220 may determine the initial search location based on the location data 254. Because the third tracking system 250 is tracking the object during the time period that the first tracking system 210 and the second tracking system 220 are not processing images, the estimated location based on the location data 254 may have a higher likelihood of being correct than an a location estimated based on a previously processed image. Thus, by providing the location data 254 during time periods that the first tracking system 210 and the second tracking system are not processing images, the third tracking system 250 may reduce a likelihood that the first tracking system 210 and the second tracking system 220 lose track of the object or inefficiently search an entirety of a next-processed image.

During operation, the image processing system 202 may receive the sequence of images 206. During an initialization time period of the first tracking system 210 and the second tracking system 220, the third tracking system 250 may provide the location data 254 to the first tracking system 210 and to the second tracking system 220. After the initialization time period, the first tracking system 210 may determine the first tracking data 216 based on the location data 254 (e.g., by estimating an initial search location in an image based on the location data 254). Similarly, the second tracking system 220 may determine the second tracking data 226 based on the location data 254. The tracker selection system 230 may receive the first tracking data 216, the second tracking data 226, a first confidence value 218, and a second confidence value 228, and may determine the output data 244, as described with reference to FIG. 1. The output data 244 may be provided to the first tracking system 210, the second tracking system 220, and the third tracking system 250. The third tracking system 250 may be re-initialized based on the output data 244 and may provide additional location data to the first tracking system 210 and to the second tracking system 220 (e.g., during a time period between processed images). The first tracking system 210 and the second tracking system 220 may track the object in a subsequent image based on the output data 244 and based on the additional location data.

Figure 3:
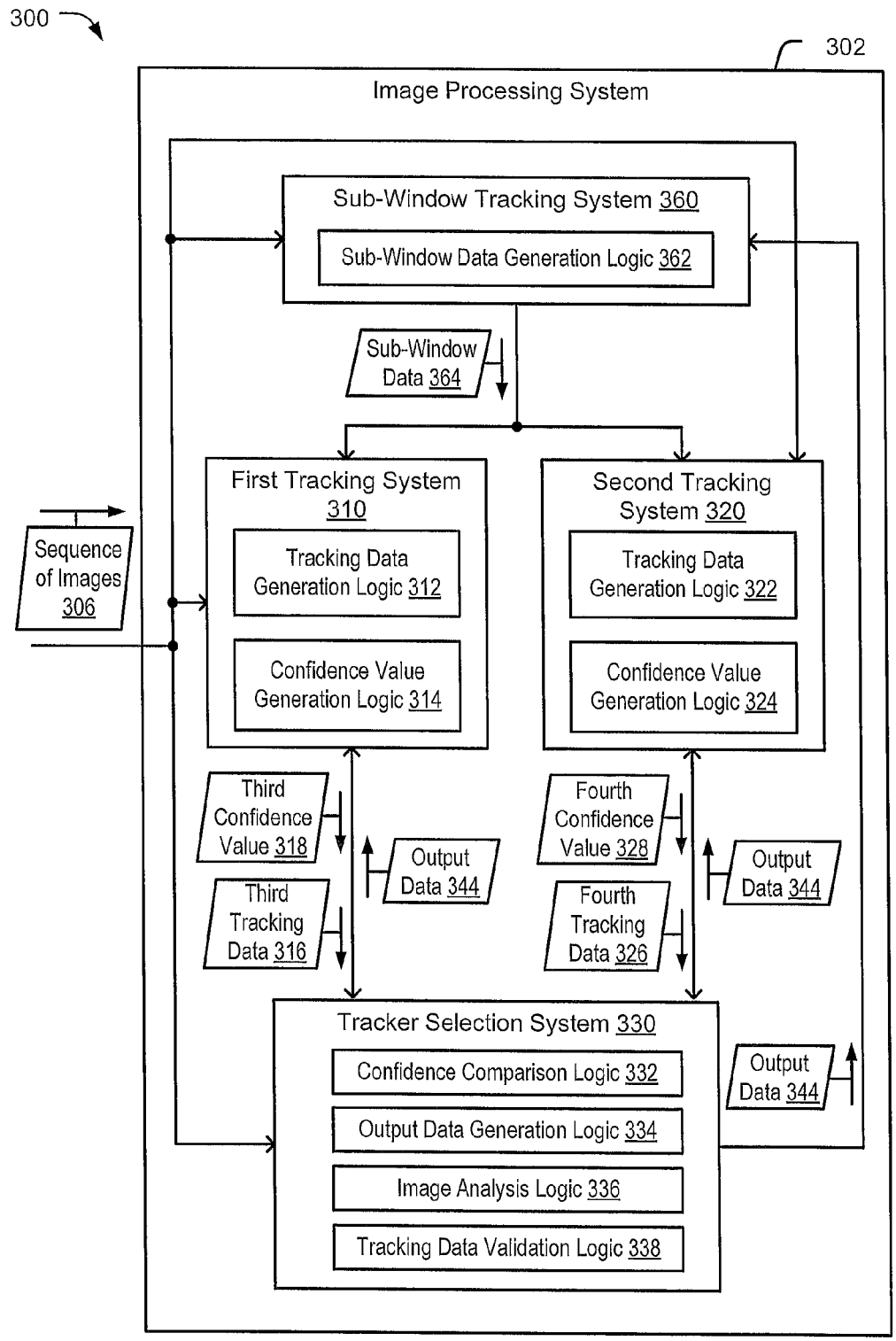
FIG. 3 is a diagram of a second particular embodiment of the image processing system of FIG. 1 that includes a sub-window tracking system.

FIG. 3 illustrates a second particular embodiment of the system 100 of FIG. 1 and is generally designated 300. The system 300 includes an image processing system 302, which may include or correspond to the image processing system 102 of FIG. 1. As illustrated in FIG. 3, the image processing system 302 receives a sequence of images 306 from an image capture device, such as the image capture device 104 of FIG. 1, which is not shown for convenience of illustration. The image processing system 302 includes a first tracking system 310, a second tracking system 320, and a tracker selection system 330 (e.g., a hybrid tracker). The first tracking system 310 includes tracking data generation logic 312 and confidence value generation logic 314, and the second tracking system 320 includes tracking data generation logic 322 and confidence value generation logic 324. The tracker selection system 330 includes confidence comparison logic 332, output data generation logic 334, image analysis logic 336, and tracking data validation logic 338. The first tracking system 310, the second tracking system 320, and the tracker selection system 330, and components thereof, may include or correspond to the first tracking system 110, the second tracking system 120, and the tracker selection system 130, respectively, of FIG. 1.

Additionally, the image processing system 302 includes a sub-window tracking system 360 (e.g., a "foveated tracking system"). The sub-window tracking system 360 may be configured to receive output data 344 from the tracker selection system 330 and to generate sub-window data 364 based on the output data 344. For example, the sub-window tracking system 360 may include sub-window data generation logic 362 configured to generate the sub-window data 364. The sub-window data generation logic 362 may be configured to receive the output data 344 (indicating a location in an image of the sequence of images 306) and to compare the location to a previous location in a previously processed image of the sequence of images 306. The previous location may include a location in a first image that is indicated by a user selection (or generated automatically), or a location in a previously image indicated by previous output data from the tracker selection system 330. The sub-window data generation logic 362 may be configured to determine movement indication data, such as a direction of movement of the object, a velocity of movement of the object, or other information, based on the comparison.

The sub-window data generation logic 362 may determine a location of a sub-window in a subsequent image based on the movement indication data and may generate the sub-window data 364 indicating the location of the sub-window. For example, the sub-window data 364 may include location coordinates of a center of the sub-window and a size (e.g., a length and a width) of the sub-window, location coordinates of four corners of the sub-window, or some other data indicating the location of the sub-window. The sub-window tracking system 360 may provide the sub-window data 364 to the first tracking system 210 and the second tracking system 220 to reduce an area of the subsequent image that is processed by the first tracking system 210 and the second tracking system 220.

During operation, the first tracking system 310 may determine the first tracking data 316 (indicating a location of the object in an image of the sequence of images 306) and a first confidence value 318, and the second tracking system 320 may determine the second tracking data 326 and a second confidence value 328. The tracker selection system 330 may receive the first tracking data 316, the first confidence value 318, the second tracking data 326, and the second confidence value 328, and the tracker selection system 330 may determine the output data 344, as described with reference to FIG. 1. The tracker selection system 330 may provide the output data 344 to the first tracking system 310, to the second tracking system 320, and to the sub-window tracking system 360.

The sub-window tracking system 360 may receive the output data 344 and may determine the sub-window data 364 based on the output data 344. The sub-window data 364 may indicate a location of a sub-window in a subsequent image of the sequence of images 306. The sub-window tracking system 360 may provide the sub-window data 364 to the first tracking system 310 and to the second tracking system 320. The first tracking system 210 and the second tracking system 220 may track the object in the subsequent image based on the output data 344 and the sub-window data 364. For example, if the first tracking system 310 or the second tracking system 320 performs a search of the subsequent image for the object, the search may be limited to the sub-window and a remainder of the subsequent image may not be searched. In this embodiment, the sub-window may reduce a search area in the subsequent image. In another particular embodiment, the first tracking system 210 and the second tracking system 220 search in the sub-window of the subsequent image initially, and if the object is not found in the sub-window, then a search of the remainder of the subsequent image may be performed. In this embodiment, the tracking efficiency may be increased by searching the sub-window before performing a processor-intensive search of the remainder of the subsequent image. By reducing an area of an image that is searched, or an area that is initially searched, the sub-window tracking system 360 may increase efficiency and decrease power consumption and processing resources used by the first tracking system 310 and the second tracking system 320.

Although FIG. 2 and FIG. 3 are illustrated as different embodiments, in another particular embodiment, components from the image processing system 202 of FIG. 2 and components of the image processing system 302 of FIG. 3 may be combined in a single image processing system. For example, an image processing system may include a first tracking system (e.g., the first tracking system 110 of FIG. 1, the first tracking system 210 of FIG. 2, or the first tracking system 310 of FIG. 3), a second tracking system (e.g., the second tracking system 120 of FIG. 1, the second tracking system 220 of FIG. 2, or the second tracking system 320 of FIG. 3), a tracker selection system (e.g., the tracker selection system 130 of FIG. 1, the tracker selection system 230 of FIG. 2, or the tracker selection system 330 of FIG. 3), a third tracking system (e.g., the third tracking system 250 of FIG. 2), and a sub-window tracking system (e.g., the sub-window tracking system 360 of FIG. 3).

Figure 4:
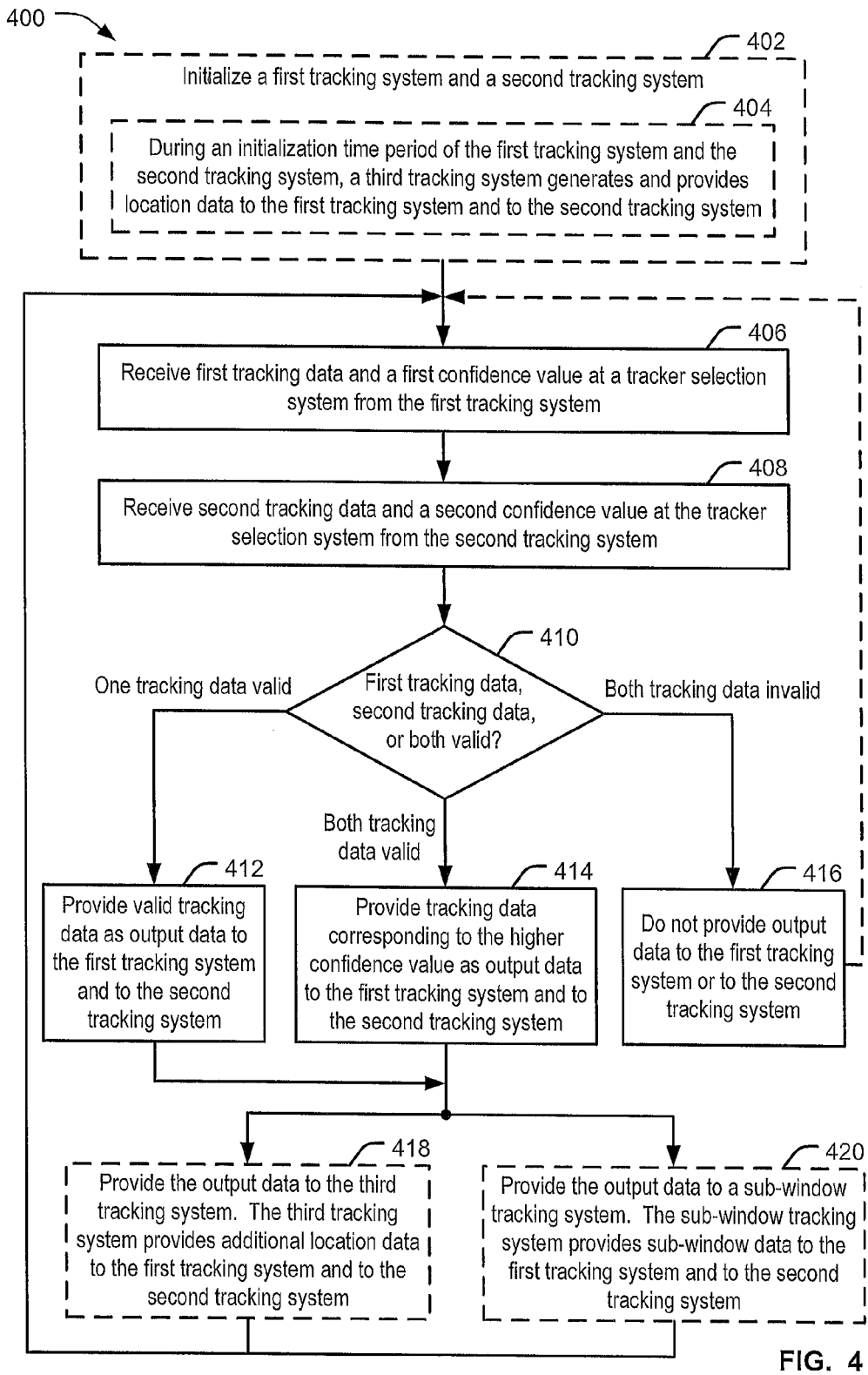
FIG. 4 is a flow chart of a particular embodiment of a method of providing output data to components of an image processing system based on tracking data and confidence values received from a first tracking system and a second tracking system.

FIG. 4 illustrates a flow chart of a particular embodiment of a method 400 of providing output data to components of an image processing system based on tracking data and confidence values received from a first tracking system and a second tracking system. In a particular embodiment, the method 400 may be performed at the tracker selection system 130 of FIG. 1, the tracker selection system 230 of FIG. 2, or the tracker selection system 330 of FIG. 3.

The method 400 includes initializing a first tracking system and a second tracking system, at 402. For example, with reference to FIG. 2, the first tracking system 210 and the second tracking system 220 may receive image data including an object in a first image (e.g., based on a user input or determined automatically) and the first tracking system 210 and the second tracking system 220 may determine data used to track the object in subsequent images (e.g., feature data or instances) during the initialization time period. During the initialization time period, the first tracking system and the second tracking system may not process additional images of the sequence of images. During the initialization time period, a third tracking system may track the object and may provide location data to the first tracking system and to the second tracking system, at 404. For example, the third tracking system may be configured to determine the location data (e.g., to track the object) by determining whether groups (e.g., patches) of pixels from images of the sequence of images match, and the first tracking system and the second tracking system may receive the location data and track the object in a next-processed image (e.g., determine an initial search location) based on the location data.

The method 400 includes receiving first tracking data and a first confidence value at a tracker selection system from the first tracking system, at 406. The first tracking data may indicate a first location of a first region where the first tracking system has tracked the object in an image (e.g., the next-processed image), and the first confidence value may indicate a likelihood that the first tracking system is tracking the object. The method 400 includes receiving second tracking data and a second confidence value at the tracker selection system from the second tracking system, at 408. The second tracking data may indicate a second location of a second region where the second tracking system has tracked the object in the image, and the second confidence value may indicate a likelihood that the second tracking system is tracking the object.

The method 400 includes determining whether the first tracking data, the second tracking data, or both, are valid, at 410. For example, the first tracking system may determine whether the first tracking data and the second tracking data are valid based on a comparison of tracking fingerprints or using some other validation method. When only one tracking data is valid, the method 400 continues to 412, where the valid tracking data is provided as output data to the first tracking system and to the second tracking system. For example, with reference to FIG. 1, when only one of the first tracking data 116 and the second tracking data 126 is valid, the valid tracking data is included in the output data 144. After providing the output data, the method 400 continues to steps 418 and 420.

When both tracking data are valid, the method 400 continues to 414, where tracking data corresponding to the higher confidence value is provided as output data to the first tracking system and to the second tracking system. For example, with reference to FIG. 1, the tracker selection system 130 compares the first confidence value 118 to the second confidence value 128, and based on a result of the comparison, the tracking data corresponding to the higher confidence value is included in the output data 144. After providing the output data, the method 400 continues to steps 418 and 420.

When both tracking data are invalid (e.g., neither tracking data is valid), the method 400 continues to 416, where output data is not provided to the first tracking system or to the second tracking system. For example, based on a determination that both the tracking data are invalid, the tracker selection system may not provide output data. In a particular embodiment, an error condition is generated. In other embodiments, the method 400 returns to step 406, and the tracker selection system may continue to receive tracking data from the first tracking system and the second tracking system in case one of the tracking systems is able to track the object in a subsequent image of the sequence of images.

The method 400 includes providing the output to the third tracking system, at 418. The third tracking system may provide additional location data to the first tracking system and to the second tracking system. For example, the third tracking system may be re-initialized based on the output data, and the third tracking system may provide additional location data to the first tracking system and to the second tracking system during a time period that the first tracking system and the second tracking system do not process received images.

Additionally or alternatively, the method 400 includes providing the output data to a sub-window tracking system (e.g., a foveated tracking system). The sub-window tracking system may determine sub-window data based on the output data and may provide the sub-window data to the first tracking system and to the second tracking system. For example, the sub-window tracking system may determine a location of a sub-window to be searched in a subsequent image, and the sub-window tracking system may provide the sub-window data indicating the location of the sub-window to the first tracking system and to the second tracking system. The first tracking system and the second tracking system may track the object in the sub-window of the subsequent image.

As illustrated by the dashed lines in FIG. 4, one or more steps of the method 400 may be optional and may not be performed in all embodiments. For example, in embodiments that do not include the third tracking system 250 of FIG. 2, the steps 402, 404, and 418 may not be performed. As another example, in embodiments that do not include the sub-window tracking system 360 of FIG. 3, step 420 may not be performed.

Figure 5:
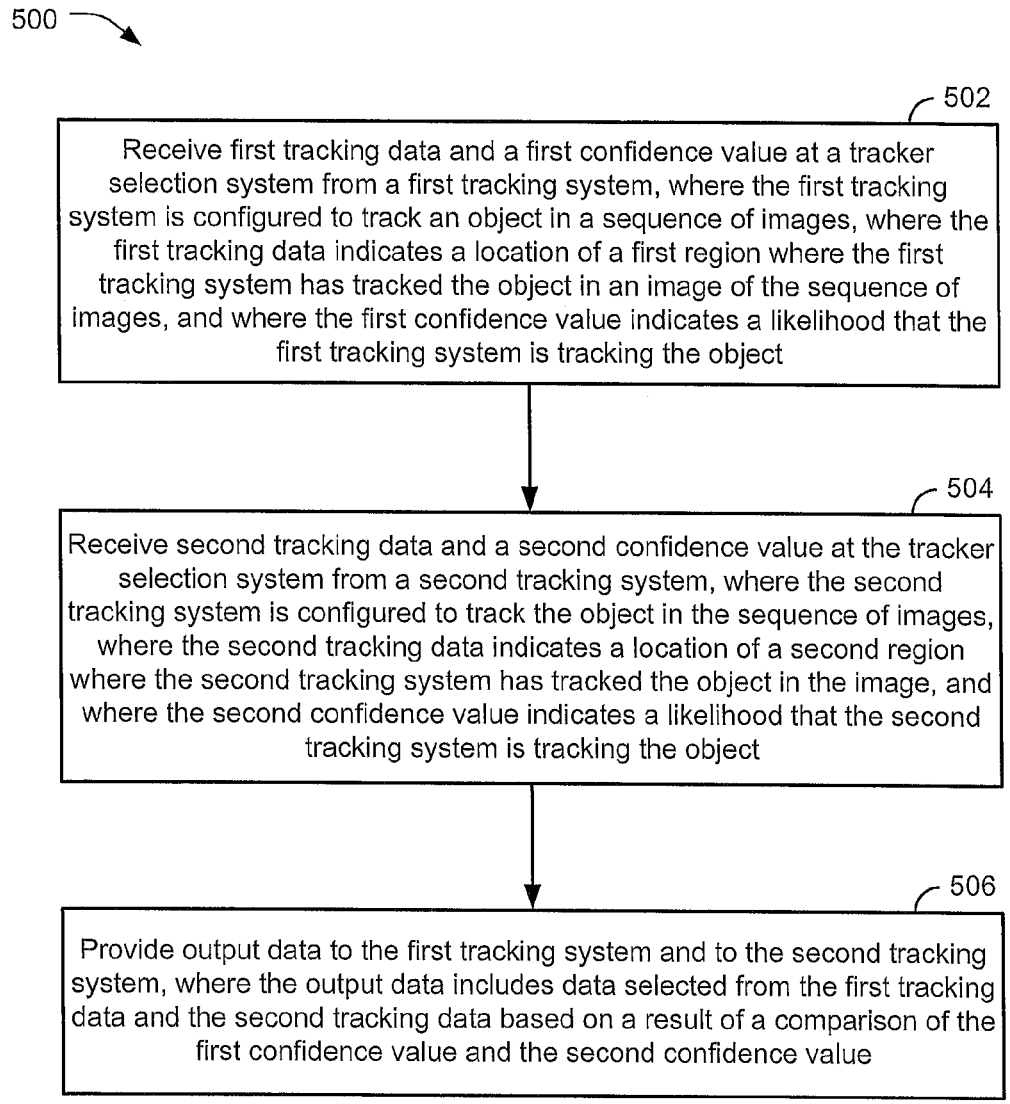
FIG. 5 is a flow chart of a particular embodiment of a method of providing output data to a first tracking system and to a second tracking system based on a result of a comparison of confidence values.

FIG. 5 illustrates a flow chart of a particular embodiment of a method 500 of providing output data to a first tracking system and to a second tracking system based on a result of a comparison of confidence values. In a particular embodiment, the method 500 may be performed at the tracker selection system 130 of FIG. 1, the tracker selection system 230 of FIG. 2, or the tracker selection system 330 of FIG. 3.

The method 500 includes receiving first tracking data and a first confidence value at a tracker selection system from a first tracking system, at 502. The first tracking system may be configured to track an object in a sequence of images, and the first tracking data may indicate a first location of a first region where the first tracking system has tracked the object in an image of the sequence of images. The first confidence value may indicate a likelihood that the first tracking system is tracking the object. For example, with reference to FIG. 1, the tracker selection system 130 receives the first tracking data 116 and the first confidence value 118 from the first tracking system 110.

The method 500 includes receiving second tracking data and a second confidence value at the tracker selection system from a second tracking system, at 504. The second tracking system may be configured to track the object in the sequence of images, and the second tracking data may indicate a second location of a second region where the second tracking system has tracked the object in the image. The second confidence value may indicate a likelihood that the second tracking system is tracking the object. For example, with reference to FIG. 1, the tracker selection system 130 receives the second tracking data 126 and the second confidence value 128 from the second tracking system 120. In a particular embodiment, the first tracking system is a feature-based tracking system and the second tracking system is an instance-based tracking system.

The method 500 further includes providing output data to the first tracking system and to the second tracking system, at 506. The output data may include data selected from the first tracking data and the second tracking data based on a result of a comparison of the first confidence value and the second confidence value. For example, with reference to FIG. 1, the tracker selection system 130 provides the output data 144 to the first tracking system 110 and the second tracking system 120. The output data 144 may include the first tracking data 116 or the second tracking data 126 based on a result of a comparison of the first confidence value 118 and the second confidence value 128. The first tracking system and the second tracking system may be configured to track the object in a subsequent image of the sequence of images based on the output data. For example, with reference to FIG. 1, the first tracking system 110 may be configured to generate third tracking data indicating a third location of a third region in a subsequent image of the sequence of images 106 based on the output data 144, and the second tracking system 120 may be configured to generate fourth tracking data indicating a fourth location of a fourth region in the subsequent image based on the output data 144.

In a particular embodiment, the method 500 includes, prior to providing the output data, determining whether the first tracking data is valid and whether the second tracking data is valid. The output data may include tracking data selected based on the result of the comparison of the confidence value when both tracking data are valid. When only one tracking data is valid, the output data may include the valid tracking data. For example, when the first tracking data is valid and the second tracking data is invalid, the output data may include the first tracking data. When both tracking data are invalid (e.g., neither tracking data is valid), output data corresponding to the image may not be provided, or may not include tracking data.

In another particular embodiment, the method 500 may include determining one or more characteristics of the sequence of images and determining whether the one or more characteristics include at least one of a first set of characteristics. The output data may include the first tracking data when the one or more characteristics include at least one of the first set of characteristics. For example, with reference to FIG. 1, the output data 144 may include the first tracking data 116 when the one or more characteristics include at least one characteristic from a first set of characteristics associated with better performance at the first tracking system 110 than at the second tracking system 120. The method 500 may also include determining whether the one or more characteristics include at least one of a second set of characteristics and disabling the first tracking system when the one or more characteristics include at least one of the second set of characteristics. For example, with reference to FIG. 1, the disable instruction 146 may be provided to the first tracking system 110 when the one or more characteristics include at least one characteristic from a second set of characteristics associated with a high failure rate at the first tracking system 110.

In another particular embodiment, the output data may be provided to a third tracking system that is configured to provide location data to the first tracking system and to the second tracking system during one or more time periods that the first tracking system and the second tracking system do not process images. The third tracking system may track the object in the sequence of images by performing patch matching. For example, the third tracking system may be configured to determine a first group of pixels that corresponds to the object in a first image of the sequence of images. The third tracking system may also be configured to compare the first group of pixels to a second group of pixels in a second image of the sequence of images. The third tracking system may further be configured to determine the location data based on a location of the second group of pixels when a result of the comparison exceeds a threshold value. The first tracking system and the second tracking system may determine tracking data associated with a subsequent image based on the location data (e.g., by determining an initial search location in the subsequent image), as described with reference to FIG. 2.

In another particular embodiment, the output data may be provided to a sub-window tracking system that is configured to provide sub-window data to the first tracking system and to the second tracking system. The sub-window tracking system may determine a location of a sub-window in a subsequent image based on the output data, and the sub-window data may indicate the location of the sub-window. The first tracking system and the second tracking system may, based on receipt of the sub-window data, search the sub-window of the subsequent image to track the object when processing the subsequent image.

The methods 400 and 500 of FIGS. 4 and 5 respectively may be initiated or controlled by a processing unit, such as a central processing unit (CPU), a digital signal processor (DSP), a controller, an application-specific integrated circuit (ASIC), a field-programmable gate array (FPGA) device, another hardware device, a firmware device, or any combination thereof. As an example, the method 400 of FIG. 4 and/or the method 500 of FIG. 5 may be initiated or controlled by one or more processors executing code (e.g., instructions stored in a memory device).

Figure 6:
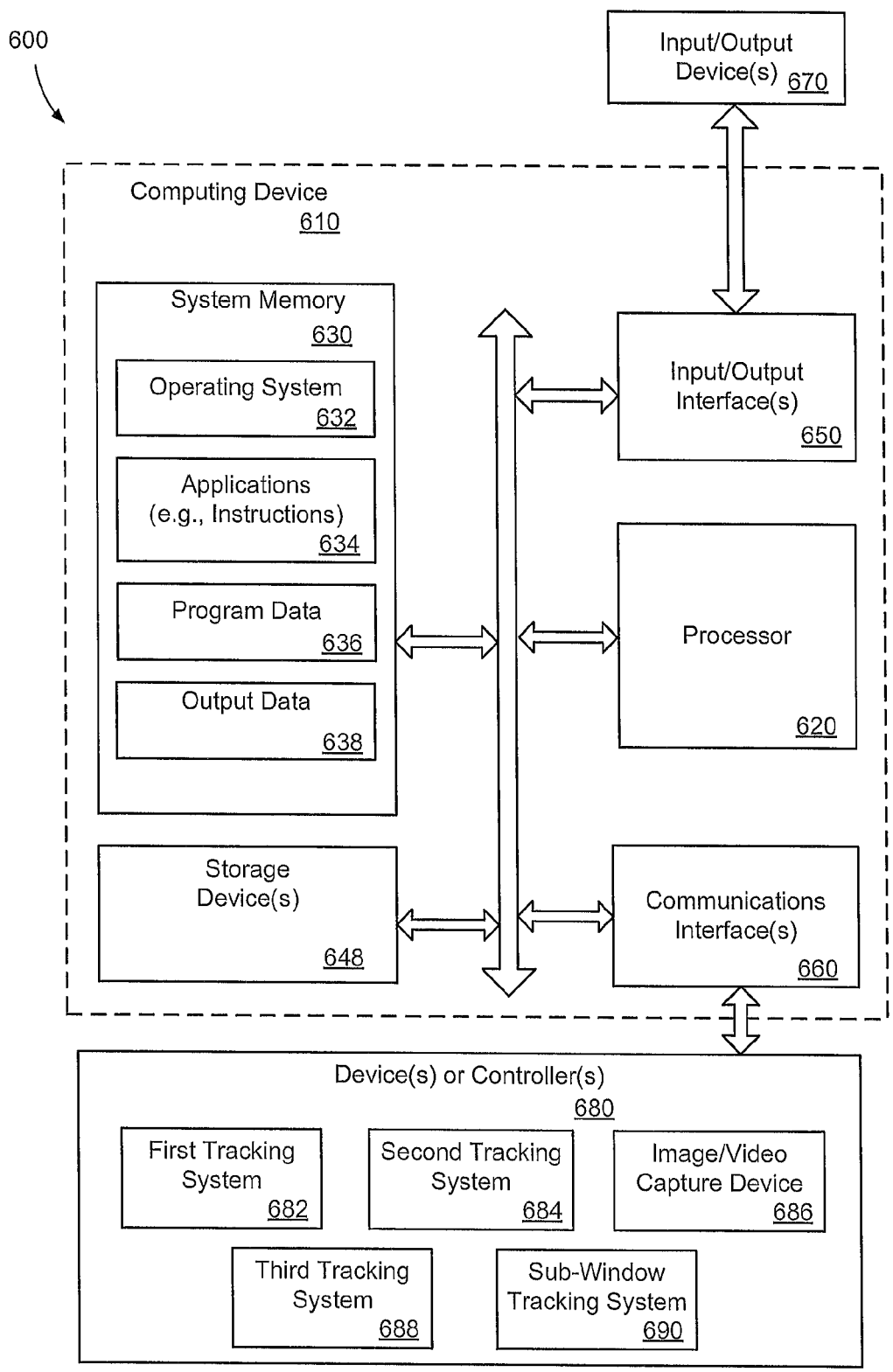
FIG. 6 is a block diagram that illustrates a particular embodiment of a computing system (e.g., a tracker selection system) operable to provide output data to a first tracking system and to a second tracking system based on a result of a comparison of confidence values.

FIG. 6 is a block diagram of a computing environment 600 including a computing device 610 operable to provide output data to a first tracking system and a second tracking system based on a result of a comparison of confidence values. For example, the computing device 610 may be included within or correspond to the image processing system 102 of FIG. 1, the image processing system 202 of FIG. 2, the image processing system 302 of FIG. 3, or a combination thereof. In a particular embodiment, the computing device 610 corresponds to the tracker selection system 130 of FIG. 1, the tracker selection system 230 of FIG. 2, the tracker selection system 330 of FIG. 3, or a combination thereof.

The computing device 610 may include at least one processor 620. Within the computing device 610, the at least one processor 620 may communicate with a system memory 630, one or more storage devices 648, one or more input/output interfaces 650, one or more communications interfaces 660, or a combination thereof.

The system memory 630 may include volatile memory devices (e.g., random access memory (RAM) devices), nonvolatile memory devices (e.g., read-only memory (ROM) devices, programmable read-only memory, and flash memory), or both. The system memory 630 may include an operating system 632, which may include a basic input/output system for booting the computing device 610 as well as a full operating system to enable the computing device 610 to interact with users, other programs, and other devices. The system memory 630 may also include one or more applications (e.g., instructions) 634, program data 636, and output data 638. The program data 636 may include data used by the applications 634 to perform respective functions of the applications 634. The applications 634 may include instructions executable by the at least one processor 620 to provide output data to a first tracking system 682 and a second tracking system 684. For example, the at least one processor 620 may receive tracking data and confidence values from the first tracking system 682 and the second tracking system 684. Based on a result of a comparison of the confidence values, the at least one processor 620 may generate the output data 638 based on the tracking data and may provide the output data 638 to the first tracking system 682 and to the second tracking system 684.

The one or more storage devices 648 may include nonvolatile storage devices, such as magnetic disks, optical disks, or flash memory devices. The storage devices 648 may include both removable and non-removable memory devices. In a particular embodiment, the storage devices 648 may be configured to store the operating system 632, the applications 634, the program data 636, the output data 638, or a combination thereof. The system memory 630 and the storage devices 648 may include tangible, non-transitory computer readable media devices that are physical devices and are not a signal.

In a particular embodiment, the at least one processor 620 is configured to execute computer executable instructions, such as the applications 634, stored at the system memory 630. The instructions may be executable to cause the at least one processor 620 to perform operations. The operations may include receiving first tracking data and a first confidence value from the first tracking system 682. The first tracking system 682 may be configured to track an object in a sequence of images and the first tracking data may indicate a first location of a first region where the first tracking system 682 has tracked the image in an image of the sequence of images. The first confidence value may indicate a likelihood that the first tracking system 682 is tracking the object. The operations may include receiving second tracking data and a second confidence value from the second tracking system 684. The second tracking system 684 may be configured to track the object in the sequence of images and the second tracking data may indicate a second location of a second region where the second tracking system 684 has tracked the object in the image. The second confidence value may indicate a likelihood that the second tracking system 684 is tracking the object. The operations may further include providing output data to the first tracking system 682 and to the second tracking system 684. The output data may include data selected from the first tracking data and the second tracking data based on a result of a comparison of the first confidence value and the second confidence value.

The one or more input/output interfaces 650 may enable the computing device 610 to communicate with one or more input/output devices 670 to facilitate user interaction. For example, the one or more input/output interfaces 650 may be adapted to receive input from a user, to receive input from another computing device, or a combination thereof. The input/output interfaces 650 may be configured to provide the input signal to the at least one processor 620 in response to input from a user. The input/output interfaces 650 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 670 may include user interface devices and displays, including some combination of buttons, keyboards, pointing devices, displays, speakers, microphones, touch screens, and other devices. The processor 620 may detect interaction events based on user input received via the input/output interfaces 650. Additionally, the processor 620 may send a display to a display device via the input/output interfaces 650.

The one or more communications interfaces 660 may enable the computing device 610 to communicate with one or more other computing devices or controllers 680. The one or more communications interfaces 660 may include wired Ethernet interfaces, Institute of Electrical and Electronics Engineers (IEEE) 802 wireless interfaces, Bluetooth communication interfaces, electrical (or power line) interfaces, optical or radio frequency interfaces, or other wired or wireless interfaces. The other computer devices or controllers 680 may include host computers, servers, workstations, portable computers, telephones, tablet computers, or any other communication device or component. Additionally, the other computer devices or controllers 680 may include the first tracking system 682, the second tracking system 684, an image capture device 686, a third tracking system 688, and a sub-window tracking system 690. The one or more communications interfaces 660 may enable the computing device 610 to communicate with the first tracking system 682, the second tracking system 684, the image capture device 686, the third tracking system 688, and the sub-window tracking system 690. For example, the computing device 610 may receive a sequence of images from the image capture device 686, the computing device 610 may receive the first tracking data and the first confidence value from the first tracking system 682, and/or the computing device 610 may receive the second tracking data and the second confidence value from the second tracking system 684. Additionally, the computing device 610 may provide the output data 638 (e.g., the output data 144 of FIG. 1) to the first tracking system 682, the second tracking system 684, the third tracking system 688, the sub-window tracking system 690, or a combination thereof.

Figure 7:
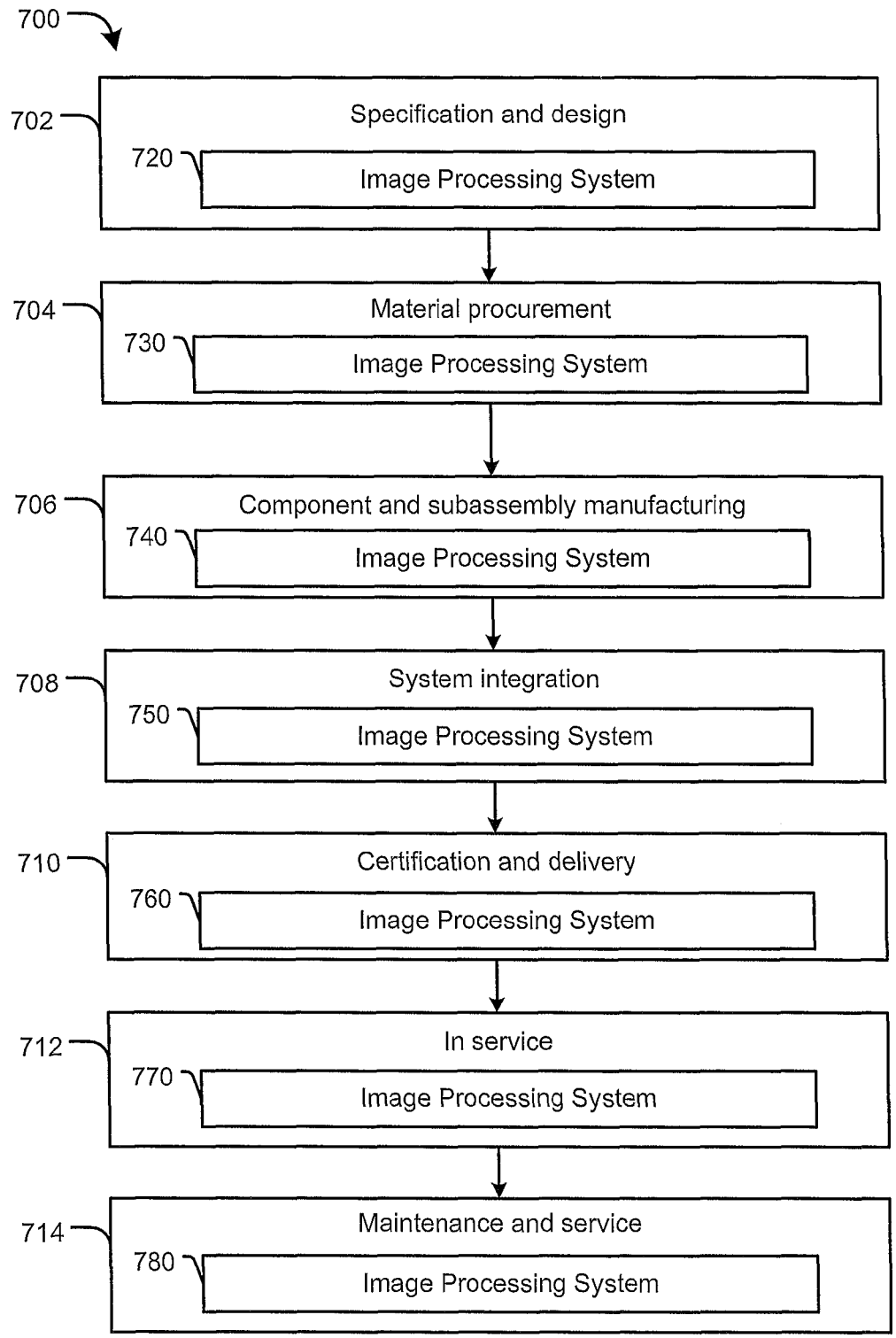
FIG. 7 is a flow chart illustrative of a life cycle of an aircraft that includes an image processing system including a first tracking system, a second tracking system, and a tracker selection system.
Figure 8:
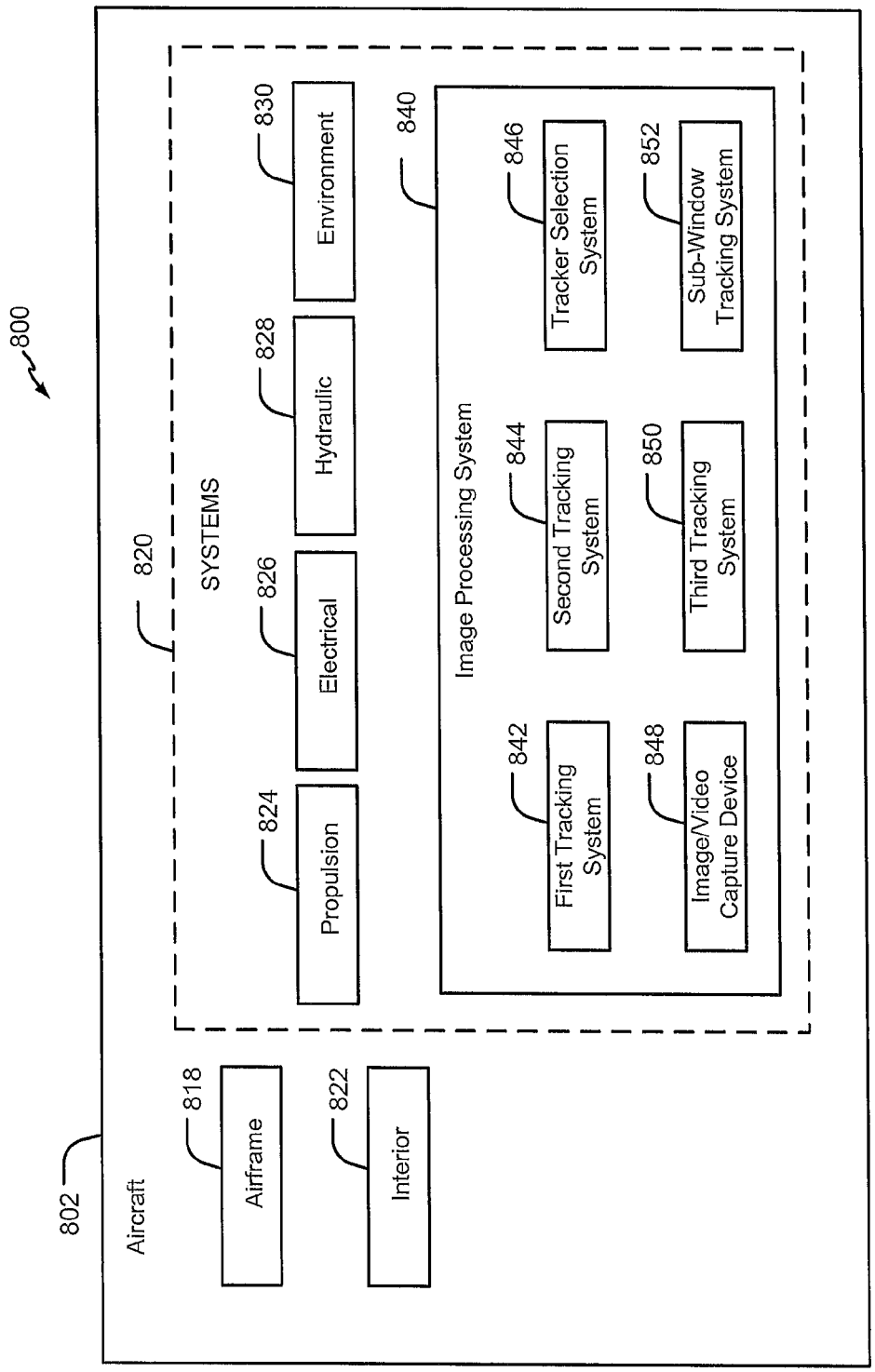
FIG. 8 is a block diagram of an illustrative embodiment of an aircraft that includes an image processing system including a first tracking system, a second tracking system, and a tracker selection system.

Referring to FIGS. 7 and 8, examples of the disclosure are described in the context of a vehicle manufacturing and service method 700 as illustrated by the flow chart of FIG. 7 and a vehicle system 800 as illustrated by the block diagram of FIG. 8. A vehicle produced by the vehicle manufacturing and service method 700 of FIG. 7 and a vehicle 802 of FIG. 8 may include an aircraft, a watercraft, a land craft, a spacecraft, an autonomous vehicle, or a combination thereof.

Referring to FIG. 7, a flowchart illustrative of a life cycle of an aircraft that includes an image processing system including a first tracking system and a second tracking system is shown and designated 700. During pre-production, the exemplary method 700 includes, at 702, specification and design of an aircraft, such as the aircraft 802 described with reference to FIG. 8. During specification and design of the aircraft, the method 700 may include, at 720, specification and design of an image processing system. The image processing system may include a first tracking system, a second tracking system, and a tracker selection system. For example, the image processing system may include the image processing system 102 of FIG. 1, the image processing system 202 of FIG. 2, the image processing system 302 of FIG. 3, the computing device 610 of FIG. 6, or a combination thereof. At 704, the method 700 includes material procurement. At 730, the method 700 includes procuring materials for the image processing system.

During production, the method 700 includes, at 706, component and subassembly manufacturing and, at 708, system integration of the aircraft. The method 700 may include, at 740, component and subassembly manufacturing (e.g., producing the first tracking system, the second tracking system, or the tracker selection system) of the image processing system and, at 750, system integration (e.g., coupling the tracker selection system to the first tracking system and to the second tracking system) of the image processing system, At 710, the method 700 includes certification and delivery of the aircraft and, at 712, placing the aircraft in service. Certification and delivery may include, at 760, certifying the image processing system. At 770, the method 700 includes placing the image processing system in service. While in service by a customer, the aircraft may be scheduled for routine maintenance and service (which may also include modification, reconfiguration, refurbishment, and so on). At 714, the method 700 includes performing maintenance and service on the aircraft. At 780, the method 700 includes performing maintenance and service of the image processing system. For example, maintenance and service of the image processing system may include replacing one or more of the first tracking system, the second tracking system, the tracker selection system, or a combination thereof.

Each of the processes of the method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Referring to FIG. 8, a block diagram of an illustrative embodiment of an aircraft that includes an image processing system including a first tracking system, a second tracking system, and a tracker selection system is shown and designated 800. As shown in FIG. 8, the aircraft 802 produced by the method 700 may include an airframe 818 with a plurality of systems 820 and an interior 822. Examples of high-level systems 820 include one or more of a propulsion system 824, an electrical system 826, a hydraulic system 828, an environmental system 830, and an image processing system 840, The image processing system 840 may include or correspond to the image processing system 102 described with reference to FIG. 1, the image processing system 202 described with reference to FIG. 2, the image processing system 302 described with reference to FIG. 3, or any combination thereof, and may include a first tracking system 842, a second tracking system 844, a tracker selection system 846, an image capture device 848, a third tracking system 850, and a sub-window tracking system 852. The first tracking system 842 may include or correspond to the first tracking system 110 of FIG. 1, the first tracking system 210 of FIG. 2, or the first tracking system 310 of FIG. 3, the second tracking system 844 may include or correspond to the second tracking system 120 of FIG. 1, the second tracking system 220 of FIG. 2, or the second tracking system 320 of FIG. 3, the tracker selection system 846 may include or correspond to the tracker selection system 130 of FIG. 1, the tracker selection system 230 of FIG. 2, or the tracker selection system 330 of FIG. 3, the image capture device 848 may include or correspond to the image capture device 104 of FIG. 1, the third tracking system 850 may include or correspond to the third tracking system 250 of FIG. 2, and the sub-window tracking system 852 may include or correspond to the sub-window tracking system 360 of FIG. 3. Any number of other systems may be included. Although an aerospace example is shown, the embodiments described herein may be applied to other industries, such as the automotive industry.

Apparatus and methods embodied herein may be employed during any one or more of the stages of the method 700. For example, components or subassemblies corresponding to production process 708 may be fabricated or manufactured in a manner similar to components or subassemblies produced while the aircraft 802 is in service, at 712 for example and without limitation. Also, one or more apparatus embodiments, method embodiments, or a combination thereof may be utilized during the production stages (e.g., elements 702-710 of the method 700), for example, by substantially expediting assembly of or reducing the cost of the aircraft 802. Similarly, one or more of apparatus embodiments, method embodiments, or a combination thereof may be utilized while the aircraft 802 is in service, at 712 for example and without limitation, to maintenance and service, at 714.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A method comprising:
receiving first tracking data and a first confidence value at a tracker selection system from a first tracking system, wherein the first tracking system is configured to track an object in a sequence of images using a first tracking algorithm, wherein the first tracking algorithm is an adaptive tracking algorithm configured to modify an object model by updating data representing the object, wherein the first tracking data indicates a first location of a first region where the first tracking system has tracked the object in an image of the sequence of images, and wherein the first confidence value indicates a likelihood that the first tracking system is tracking the object;
receiving second tracking data and a second confidence value at the tracker selection system from a second tracking system, wherein the second tracking system is configured to track the object in the sequence of images using a second tracking algorithm different from the first tracking algorithm, wherein the second tracking algorithm is a non-adaptive tracking algorithm configured to not modify the object model when updating data representing the object, wherein the second tracking data indicates a second location of a second region where the second tracking system has tracked the object in the image, and wherein the second confidence value indicates a likelihood that the second tracking system is tracking the object; and
providing output data to the first tracking system and to the second tracking system, wherein the output data includes data selected from the first tracking data and the second tracking data based on a result of a comparison of the first confidence value and the second confidence value.

2. The method of claim 1, wherein the first tracking system and the second tracking system are configured to track the object in a subsequent image of the sequence of images based on the output data.

3. The method of claim 1, wherein the output data includes the first tracking data when the first confidence value is greater than or equal to the second confidence value.

4. The method of claim 1, wherein the output data includes the second tracking data when the second confidence value exceeds the first confidence value, the method further comprising:
receiving, at the first tracking system, location data from a third tracking system configured to:

identify a location in a first image of the sequence of images based on a detection of a user selection of a region of the first image,
receive a second image of the sequence of images,
determine a group of pixels in a second image of the sequence of images that match the identified location, and
update the location data based on the determined group of pixels in the second image; and
receiving, at the second tracking system, the location data.

5. The method of claim 1, wherein the first tracking system is a feature-based tracking system configured to track the object based on feature data extracted from the sequence of images, and wherein the second tracking system is an instance-based tracking system configured to track the object based on one or more instances of the object in the sequence of images.

6. The method of claim 5, further comprising:
determining one or more characteristics of the sequence of images; and
determining whether the one or more characteristics include at least one characteristic of a first set of characteristics, wherein the output data includes the first tracking data when the one or more characteristics include at least one characteristic of the first set of characteristics.

7. The method of claim 6, further comprising:
determining whether the one or more characteristics include at least one characteristic of a second set of characteristics; and
disabling the first tracking system when the one or more characteristics include at least one characteristic of the second set of characteristics.

8. The method of claim 6, wherein the one or more characteristics include an image type, a number of pixels per image, a change in scale between images, a change in rotation between images, or a combination thereof.

9. The method of claim 1, wherein the first tracking system and the second tracking system are configured to receive location data from a third tracking system during a first time period, and wherein the first tracking system and the second tracking system do not process images during the first time period.

10. The method of claim 9, wherein the first time period includes an initialization time period of the first tracking system and the second tracking system, wherein the first tracking system and the second tracking system are configured to process one out of every n-number of images where n is a positive integer greater than or equal to 2, and wherein the third tracking s stem is configured to process each image of the sequence of images.

11. The method of claim 9, wherein the third tracking system is configured to track the object by:
determining a first group of pixels in a first image of the sequence of images that corresponds to the object;
comparing the first group of pixels to a second group of pixels in a second image of the sequence of images; and
determining the location data based on a location of the second group of pixels when a result of the comparison exceeds a threshold value, and wherein the location data include coordinates of a center of the second group of pixels and a size of the second group of pixels.

12. The method of claim 9, wherein the first tracking system and the second tracking system are configured to determine the first tracking data and the second tracking data based on the location data.

13. The method of claim 9, further comprising providing the output data to the third tracking system, wherein the third tracking system is further configured to generate second location data based on the output data.

14. A tracker selection system comprising:
one or more processors; and
a memory coupled to the one or more processors, the memory storing instructions that, when executed by the one or more processors, cause the one or more processors to perform operations comprising:
receiving first tracking data and a first confidence value from a first tracking system, wherein the first tracking system is configured to track an object in a sequence of images using a first tracking algorithm, wherein the first tracking algorithm is an adaptive tracking algorithm configured to modify an object model by updating data representing the object, wherein the first tracking data indicates a first location of a first region where the first tracking system has tracked the object in an image of the sequence of images, and wherein the first confidence value indicates a likelihood that the first tracking system is tracking the object;
receiving second tracking data and a second confidence value from a second tracking system, wherein the second tracking system is configured to track the object in the sequence of images using a second tracking algorithm different from the first tracking algorithm, wherein the second tracking algorithm is a non-adaptive tracking algorithm configured to not modify the object model when updating data representing the object, wherein the second tracking data indicates a second location of a second region where the second tracking system has tracked the object in the image, and
wherein the second confidence value indicates a likelihood that the second tracking system is tracking the object; and
providing output data to the first tracking system and to the second tracking system, wherein the output data includes data selected from the first tracking data and the second tracking data based on a result of a comparison of the first confidence value and the second confidence value.

15. The tracker selection system of claim 14, wherein the operations further comprise providing the output data to a sub-window tracking system configured to determine sub-window data based on the output data and to provide the sub-window data to the first tracking system and to the second tracking system.

16. The tracker selection system of claim 15, wherein the sub-window data indicates a location of a sub-window in a subsequent image of the sequence of images, and wherein the first tracking system and the second tracking system are configured to, based on receipt of the sub-window data, search the sub-window of the subsequent image to track the object when processing the subsequent image.

17. The tracker selection system of claim 14, wherein the sequence of images is received from an image capture device, and wherein the processor, the memory, the first tracking system, the second tracking system, and the image capture device are integrated in an autonomous vehicle.

18. The tracker selection system of claim 17, wherein the operations further comprise providing the output data to a server, to another system of the autonomous vehicle, or a combination thereof.

19. A non-transitory computer readable medium storing instructions that, when executed by a processor, cause the processor to:
- receive first tracking data and a first confidence value at a tracker selection system from a first tracking system, wherein the first tracking system is configured to track an object in a sequence of images using a first tracking algorithm, wherein the first tracking algorithm is an adaptive tracking algorithm configured to modify an object model by updating data representing the object, wherein the first tracking data indicates a first location of a first region where the first tracking system has tracked the object in an image of the sequence of images, and wherein the first confidence value indicates a likelihood that the first tracking system is tracking the object;
- receive second tracking data and a second confidence value at the tracker selection system from a second tracking system, wherein the second tracking system is configured to track the object in the sequence of images using a second tracking algorithm different from the first tracking algorithm, wherein the second tracking algorithm is a non-adaptive tracking algorithm configured to not modify the object model when updating data representing the object, wherein the second tracking data indicates a second location of a second region where the second tracking system has tracked the object in the image, and wherein the second confidence value indicates a likelihood that the second tracking system is tracking the object; and
- provide output data to the first tracking system and to the second tracking system, wherein the output data includes data selected from the first tracking data and the second tracking data based on a result of a comparison of the first confidence value and the second confidence value.

20. The non-transitory computer readable medium of claim 19, wherein the instructions, when executed by the processor, further cause the processor to:
- determine whether the first tracking data is valid; and
- determine whether the second tracking data is valid,
- wherein the output data includes the first tracking data when the first tracking data is valid and the second tracking data is not valid.

* * * * *